H. WHITTINGTON.
ADJUSTABLE CUT-OFF FOR STEAM ENGINES.
No. 25,541. Patented Sept. 20, 1859.
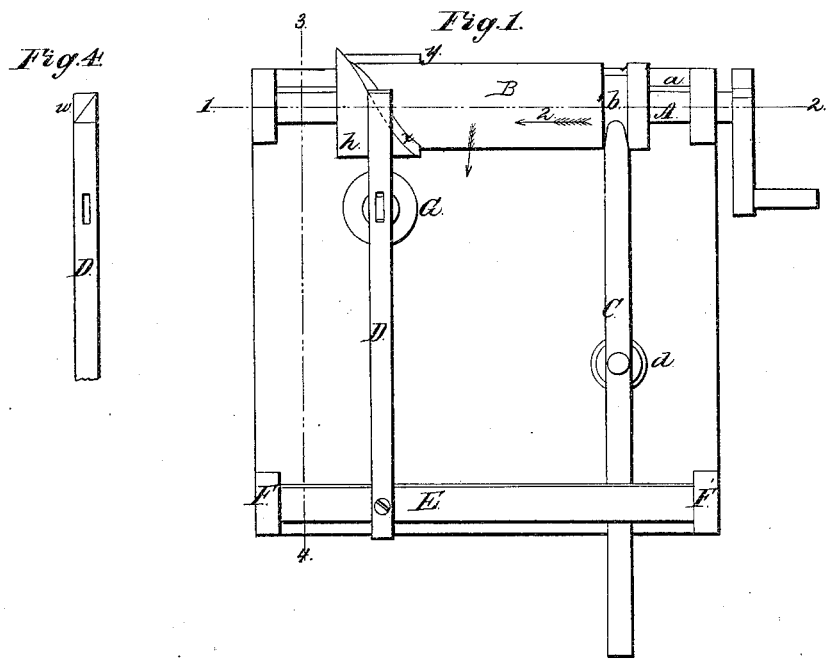
Witnesses.
Henry Howson
Horace See
Inventor.
Henry Whittington

UNITED STATES PATENT OFFICE.

HENRY WHITTINGTON, OF PHILADELPHIA, PENNSYLVANIA.

CUT-OFF GEAR FOR STEAM APPARATUS.

Specification of Letters Patent No. 25,541, dated September 20, 1859.

*To all whom it may concern:*

Be it known that I, HENRY WHITTINGTON, of the city and county of Philadelphia and State of Pennsylvania, have invented a new and useful Improvement in Cut-Off Gear for Steam-Engines; and I do hereby declare the following to be a full, clear, and exact description of the same, reference being had to the accompanying drawing and to the letters of reference marked thereon.

My invention relates to an improvement in that class of cut off motions in which a revolving spiral cam controlled by the governor is used for operating the valve, and my improvement consists in a sleeve having spiral projections with inclined edges, in combination with a valve which is raised by the said sleeve and the descent of which caused by the pressure of steam above the valve, is retarded by the inclined edges of the projections as described hereafter, so that the descent of the cut off lever may be gradual and unaccompanied with that noise and jar which results from the movement of this class of cut off apparatus.

In order to enable others skilled in the art to make and use my invention I will now proceed to describe its construction and operation.

On reference to the accompanying drawing which forms part of this specification, Figure 1, is a plan view of my cut off motion for steam engines. Fig. 2, a sectional elevation on the line 1—2, Fig. 1. Fig. 3, the same on the line 3—4, Fig. 1. Fig. 4, a detached view showing the under side of the cut off lever.

Similar letters refer to similar parts throughout the several views.

A is a shaft driven by the engine and carrying the sleeve B, a feather $a$ being secured to the shaft and fitting in a slot in the sleeve so that the latter may have a longitudinal but no other movement independent of the shaft. A groove $b$, is cut into the sleeve at one end and into this groove fits the forked end of the lever $c$, which is hung to a pin $d$, and which is controlled by the governor.

D is the cut off lever secured to the rock shaft E, which moves in the boxes F, and F', and to this lever is connected the cut off valve G through the seat of which the steam is admitted to the steam chest of the engine.

On the sleeve are two projections $h$, the edge $x$ of each projection being such as to form a spiral shoulder on the sleeve, and the edge $y$ of each projection being rounded and parallel with the center of the sleeve's rotation.

On the outer end and under side of the cut off lever D is a projection $w$, so inclined as to be adapted to the spiral edge $x$ of each projection $h$.

As the shaft A with its sleeve B, revolves in the direction of the arrow, the cut off lever will be raised by the edge of each projection $h$, in succession coming in contact with the extreme end of the lever which will remain in its elevated position until the inclined edge of the projection $w$ coincides with the spiral edge $x$ of the projection $h$, when the lever, through the pressure of steam above the valve G, will drop and the valve fall into close contact with its seat.

It will be understood that the lever D with its valve G, is raised by the edge $y$, at the commencement of every half stroke of the engine, and that the time when the lever falls and allows the valve to cut off the steam, depends upon the position of the projections $h$ in respect to the inclined projection $w$ on the lever D.

Now the arm C is so connected to the governor that when the balls of the latter fly out owing to the excessive speed of the engine, the sleeve B will move longitudinally along the shaft in the direction of the arrow 2, so that the lever D will remain elevated but a short time and but a small quantity of steam will consequently be allowed to pass into the steam chest of the engine before it is cut off by the closing of the valve. When the sleeve B is moved in a direction contrary to that pointed out by the arrow owing to the falling of the governor balls on the diminution of the speed of the engine the valve will remain elevated a longer time and allow more steam to pass to the steam chest.

A sleeve with spiral cams has been heretofore used in connection with a governor for operating a cut off valve. The main objection to this device however has been the noise and jar made by the sudden and constant dropping of the valve, an evil which my improvement has been designed to obviate.

It will be observed on reference to Fig. 2, that the spiral edge $x$ of the projection $h$ is not vertical or at right angles to the center of the sleeve, but inclined so that when the edge of the projection coincides with the inclined edge of the projection $w$ on the lever D, the latter does not at once fall with a sudden jar but slides gradually down the inclined edge $x$ of the spiral projection $h$ until the valve is closed and the steam is cut off.

The descent of the valve although gradual and comparatively noiseless is sufficiently sudden to cut off the steam at the proper time.

I am aware that sleeves having spiral cams and operated by the governor have been heretofore used. I therefore do not claim such a device nor do I desire to claim the inclined projection $w$, or the inclined edge of the spiral cam as the latter has been heretofore used in connection with slide valves, but I limit my claim to, and desire to procure Letters Patent for—

The inclined spiral edges $x$, $x$ on the revolving and sliding sleeve B, when the latter is applied to operate the cut off valve G the descent of which is caused by the pressure of steam above the valve, and when the inclined edges serve to retard the descent of the valve as herein set forth.

In testimony whereof, I have signed my name to this specification in the presence of two subscribing witnesses.

HENRY WHITTINGTON.

Witnesses:
HENRY HOWSON,
CHARLES D. FREEMAN.